(12) United States Patent
Huang et al.

(10) Patent No.: US 8,177,640 B2
(45) Date of Patent: May 15, 2012

(54) GAME SYSTEM

(75) Inventors: Kai-Fen Huang, Taipei County (TW); Cheng-Hung Huang, Taipei County (TW); Chi-Jr Huang, Taipei County (TW); Jr-Wei Lian, Taipei County (TW)

(73) Assignee: Tenx Technology Inc., Banciao, Taipei County (TW)

( * ) Notice: Subject to any disclaimer, the term of this patent is extended or adjusted under 35 U.S.C. 154(b) by 521 days.

(21) Appl. No.: 12/385,476

(22) Filed: Apr. 9, 2009

(65) Prior Publication Data
US 2009/0298596 A1 Dec. 3, 2009

(30) Foreign Application Priority Data
May 30, 2008 (TW) .............................. 97209528 U

(51) Int. Cl.
*A63F 13/00* (2006.01)
*A63F 9/24* (2006.01)
*G06F 17/00* (2006.01)
*G06F 19/00* (2006.01)

(52) U.S. Cl. ................. 463/36; 463/37; 463/43
(58) Field of Classification Search ............... 463/36
See application file for complete search history.

(56) References Cited

U.S. PATENT DOCUMENTS

| 2009/0042649 A1* | 2/2009 | Hsieh et al. ............ 463/37 |
| 2010/0248823 A1* | 9/2010 | Smith ..................... 463/29 |
| 2011/0199295 A1* | 8/2011 | Chen et al. ............. 345/156 |

* cited by examiner

*Primary Examiner* — Thien F Tran
(74) *Attorney, Agent, or Firm* — Bacon & Thomas, PLLC

(57) ABSTRACT

Disclosed is a novel game system, comprising a computer device; a game platform to communicate with the computer; and at least one game control module to detect environment data and to transfer the environment data to the game platform. In the present invention, the game platform stores at least one game software to be executed in the computer and the game platform provides the environment data to the computer whereby the computer executes the game software in association with the environment data. The environment data represent the position, orientation, acceleration of the game control module, and their variations.

21 Claims, 2 Drawing Sheets

GAME SYSTEM

FIELD OF THE INVENTION

The present invention relates to a game system, especially to a game system that communicates with a computer system through the USB interface. The present invention provides a game platform executable in a computer system, an integrated game platform that interconnects a plurality of game software and various types of motion sensor and game controller.

BACKGROUND OF THE INVENTION

The current computer game software industry is encountering several challenges:

First, the commercially available computer game titles are easy to copy. The life cycle of a game title is deeply dependent on how soon the game software is copied after it is announced to the market. The competition in the computer game market also compresses the life cycle of all computer game titles, although it at the same time makes the computer game more versatile and provides more selections to the game players. As a result, the short life cycle of the computer game makes the game developers difficult to survive.

Secondly, the security of the computer game software is always a concern of the players. Many internet security incidents have been reported, including the invasion of the Troy programs, the stealing of password and account number by the remotely controlled programs etc. The users are not satisfied with the current level of the confidentiality and the security of the game software executable in the computer environment.

In addition, the newly developed computer game controlling modes also impact the game software and hardware development technology. For example, the motion sensor-controlled type of the computer game has become the main stream in the market. Many game titles using the motion sensor as the controller have been developed and announced. However, in the motion sensor-controlled type of the computer game systems already commercially available, the games are controlled by the motion sensor in association with the acts of the human body, therefore in designing a game title the progress of the game are associated with the motion sensor following particular rules. This limitation has become a bottleneck in the development of the computer game industry.

Last but not least, the "open source" environment has brought another impact to the computer game industry. In the past the designers of the computer game develop the computer games in the "close source" environment. Nowadays to develop the computer game titles to support the open source software has become an important directory for all developers. Therefore, it is necessary to provide a new structure for the computer game system to enable the integrated development of the computer game titles.

OBJECTIVES OF THE INVENTION

The objective of this invention is to provide a game system with higher security.

Another objective of this invention is to provide a game system that encrypts, decrypts and hide the game software.

Another objective of this invention is to provide a game system that supports the open source game software.

Another objective of this invention is to provide an integrated game platform to the users.

Another objective of this invention is to provide a game system wherein the game progress is controlled by a motion sensor based controller but the functionality of the game software is not limited by the functionality of the controller.

Another objective of this invention is to provide a game system wherein a game platform is provided to interface a computer device and a game controller.

SUMMARY OF THE INVENTION

According to one aspect of the present invention a game system comprising a computer device, a game platform and at least one controller is provided. In the game system of this invention, the computer device executes the game software provided by the game platform, according to the control instructions generated by the controller and provided by the game platform. The game software is associated with a control program that encrypts, decrypts and hide the game software, approves the user's access to the game software and connects the internet. In addition, the invented game system is capable of executing the open source game software. An integrated game platform is thus provided.

According to another aspect of this invention, a game system with a motion sensor based controller is provided. The controller converts the movement or the motion vectors of the player into game instructions to control the progress of the game. In one embodiment the movements of the player are recorded and stored in the game system.

According to a further aspect of this invention, a game system wherein the game instructions are transmitted to the game platform wirelessly. The game system of this invention may further provide a multiple channel communication system, so that a plurality of wireless data transfer devices may be driven simultaneously.

The game system of the present invention comprises a computer device, a game platform and at least one game control module. The game platform communicates with the computer device. The game control module detects environmental information and provides the detected environment information to the game platform through the wireless channel or the wired channel. During the progress of a game, the computer device executes the game software supplied by the game platform, according to the game control instructions generated by the game control module and received by the computer device through the game platform.

Preferably the game platform comprises a computer interface device, a storage device and a first data transfer device, wherein the computer interface device controls the communication and the input and output of data of the game platform. To be more specific, when the game platform operates the computer interface device accesses the game data stored in the storage device and provide the game data and game control instructions to the computer device.

The computer interface device of this invention is not limited to any type. Preferably the computer interface device comprises a first control unit, a first game communication unit and a second communication unit. In them: the first control unit accesses the game data stored in the storage device through the first game communication unit and transmits game data to and receives game data from the game control module through the second game communication unit, in a wireless or wired manner. The first control unit further exchanges game data and environment data with the computer device. The first game communication unit is not limited to any type and is preferably a storage device interface. The second game communication unit is not limited to any type and is preferably the active interface of a wireless data transfer device. When the first game communication unit is a storage device interface and the second game communication unit is the active interface of a wireless data transfer device, the first data transfer device is preferably a wireless data transfer device.

The computer device of the present invention is not limited to any type and is preferably a personal computer or the terminal of a server. The computer device preferably includes a USB interface. The first control unit is not limited to any type and is preferably a USB interface controller, which communicates with the computer device through the USB interface.

In the present invention, the storage device preferably comprises a software processing unit wherein at least one game software and at least one software controller program are stored. The software processing unit is preferably an application program unit, which is preferably a game controller software or an open source software The storage device is not limited to any type and is preferably a NAND-type flash memory or a NOR-type flash memory. More specifically, the NOR-type flash memory is preferably a parallel NOR-type flash memory or a serial NOR-type flash memory.

As described above, the software processing unit preferably comprises at least one game software and at last one software controller program. Here, the game software provides the game program to be played by the player in the computer device. On the other hand, the software controller program functions to operate 1) to encrypt and to decrypt the game software or the open source software to protect the game software or the open source software from being illegally copied; 2) to compress the game software or the open source software in order to reduce the memory space in storing the game software or the open source software; 3) to hide the game software or the open source software in order to limit the access to the game software or the open source software; 4) to provide the online data transfer functions between the game system and an online game platform through the internet or to download game software or open source software through the internet; 5) to provide multiple game control functions whereby a plurality of game software may be executed in the computer device; and 6) to verify the identification of the player in order to protect the game software or the open source software. In hiding the game software or the open source software, the software controller program further operates to include the game software or the open source software into the software controller program, whereby the game software or the open source software is not executed in the computer device as an independent program file.

To be more specific, in verifying the identification of the player, the game controller program operates to obtain machine code or the serial number of the game platform, compare it with a prerecorded identification number and allow the execution of the game software or the open source software only when the machine code or the serial number matches with the prerecorded identification number. As a result, when the game software or the open source software is an illegally copied version, its execution will not be allowed. In addition, the player identification verification function is also executed upon the game platform checks in the online game platform. Therefore, in checking in the online game platform, the player needs not to key in the user ID and the password, while at the same time the invasion of the Troy programs and the illegal access to the user ID and the password by the monitoring programs may be avoided.

Preferably, each of the at least one game control module comprises a game control interface device, a motion sensor and a second data transfer device. In them, the motion sensor collects environment data, including data representing the position, orientation and movement of the motion sensor in the time domain, collected during progress of the game software when the motion sensor is held by the player and moves in accordance with the movement of the player. The game control interface device transfers the collected environment data to the game platform through the second data transfer device, in a wireless or wired manner. The number of the game control module is not limited to any particular number and is preferably at least 2, more preferably 8.

The game control module of the present invention is not limited to any type and is preferably a dual mode game control module. When the power supply in the game control module is sufficient, the game control module transfers the colleted environment data to the computer device through the wireless channel. On the other hand, when the power supply in the game control module is insufficient, the game control module transfers the colleted environment data to the computer device through a wired connection with the computer device. The wired connection also enables the recharge of electricity of the game control module.

Preferably the game control interface device comprises a first control communication unit, to communicate with the motion sensor; a second control communication unit, to communicate with the second data transfer device; and a second control unit, to communicate with the computer device. In this embodiment, the motion sensor collects the environment data and provides the environment data to the game control interface through the first control communication unit, then the game control interface provides the environment data to the second data transfer device through the second control communication unit. Alternatively, the environment data may be transferred to the second control unit through the first control communication unit, then transferred directly to the computer device via the wired connection between the second control unit and the computer device. The second data transfer device is preferably a wireless data transfer device. In the game control module, the motion sensor is not limited to any type and is preferably a gravity sensor, an acceleration sensor, a gyroscope, a motion sensor, an image sensor or their combinations. The first control communication unit is also not limited to any type and is preferably a sensor interface. In addition, the second control communication unit is not limited to any type and is preferably the passive interface of a wireless data transfer device. The second control unit is not limited to any type is preferably a USB interface controller, more preferably a USB interface controller in association with a computer.

During the progress of a game operation, in the game system the game control module uses the first control unit to communicate with the computer device and controls the input/output of data in the game system. To control the data input/output in the game system, the first control unit controls the data transfer interface of the second data transfer device and the sensor interface, as well as the recharging of electricity in the game control module. At the same time, the sensor interface serves as the communication interface between the game control module and the player. The player controls the progress of the game by operating the motion sensor that moves in accordance with the movement of the player. The motion sensor detects the positions, orientations, motion speed of itself and their variations and generates detection data. The sensor interface is in connection with the motion sensor and transfers the detection data generated by the motion sensor to the game platform through the second data transfer device.

On the game control module side, the second data transfer device is the data communication interface between the game platform and the game control module. On the game platform side, the fist data transfer device is the data communication interface between the game platform and the game control module. To be more specific, the first data transfer device of the game platform is preferably an active interface, functioning as a dominating device. The signal and data transfer of the fist data transfer device is controlled by the data transfer interface of the fist data transfer device in the game platform. On the other hand, the second data transfer device of the game control module is preferably a passive interface, functioning as a dominated device. The signal and data transfer of the second data transfer device is controlled by the fist data transfer device in the game platform. As the second data transfer device of the game control module is controlled by the fist data transfer device of the game platform, the game platform is able to control a plurality of game control modules, in their signal and data exchanges with the game platform, whereby a plurality of game software may be executed in the computer device.

As described above, in the game system of the present invention, the game software is stored in the storage device of the game platform, so that the player may have the game software accessed by and executed in the computer device. In addition, the game system of the present invention encrypts the game software before it is stored in the game platform. When the player plays the game, the computer device reads, decrypts and executes the game software. Thereby, the game software is protected from being copies or stolen.

These the other objectives and advantages of the present invention may be clearly understood by those skilled in the art from the detailed descriptions by referring to the drawings.

DETAILED DESCRIPTION OF THE INVENTION

Figure 1:
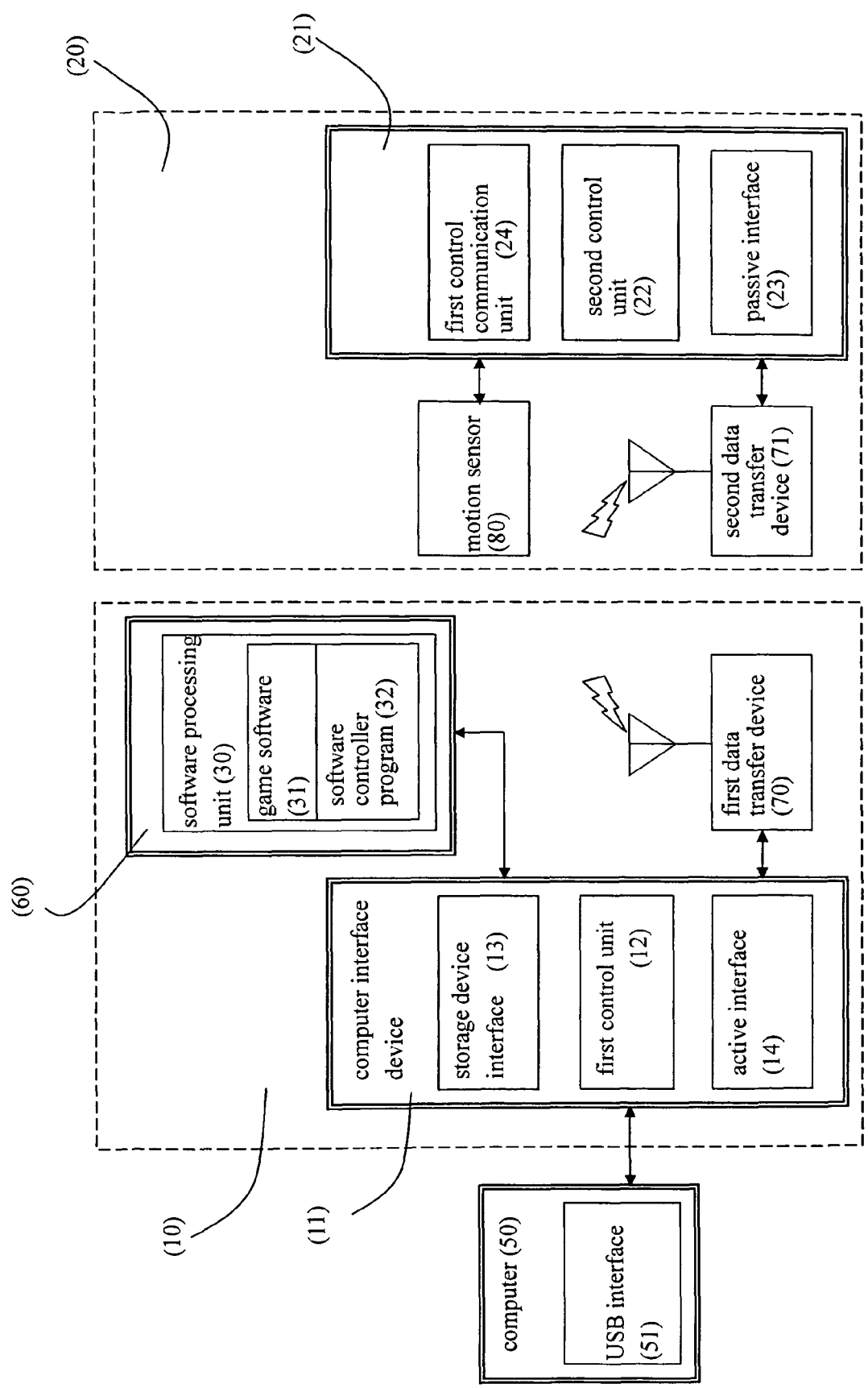
FIG. 1 illustrates the block diagram of the game system in the first embodiment of the present invention.

In the followings, several embodiments of the game system of the present invention will be described by referring to the drawings. The present invention provides a novel structure for the game system, which is different from that of the conventional game systems. In the present invention, a plurality of data transfer interface is provided and integrated with a plurality of functionalities, all implemented in a USB interfaced computer game device platform, wherein the game software is executed by the computer device.

Embodiment I

FIG. 1 illustrates the block diagram of the game system in the first embodiment of the present invention. As shown in this figure, the game system in this embodiment comprises: a computer 50, a game platform 10 and a game control module 20. In them, the game platform 10 communicates with the computer 50. The game control module 20 detects to obtain environment data, such as data representing the positions and orientations and acceleration of movements, and their variations, of the game control module 20, as it moves and stops to move under the operations and control of the player. The detected environment data are then transferred to the game platform 10. In addition, the computer 50 executes the game software stored in the game platform 10 and receives the environment data from the game platform 10.

The computer 50 comprises a USB interface 51. The game platform 10 comprises a computer interface device 11, a storage device 60 and a first data transfer device 70. A shown in this figure, the first data transfer device 70 is a wireless data transfer device. The computer interface device 11 comprises a first control unit 12. In this example, the first control unit 12 is a USB interface controller to communicate with a computer. The computer interface device 11 further comprises a second control unit 14. In this example, the second control unit 14 is the active interface of a wireless data transfer device. The computer interface device 11 further comprises a first game communication unit 13. In this example the fist game communication unit 13 is a storage device interface. The storage device 60 comprises a software processing unit 30, in which at least one game software 31 and at least one software controller program 32 are stored.

The game control module 20 comprises a game control interface device 21, a motion sensor 80 and a second data transfer device 71. As shown in FIG. 1, the second data transfer device 70 is also a wireless data transfer device. The game control interface device 21 comprises a second control unit 22, which is a USB interface controller to communicate with a computer; a second control communication unit 22, which is the passive interface of a wireless data transfer device in this example; and a first control communication unit 24, which is a sensor interface 24 in this example. The second control unit 22 may be omitted, if the game control module operates in the wireless mode.

The microcontroller 12 for the USB interface communicates with the computer 50 through the USB interface. The microcontroller 12 for the USB interface controls the data input/output of the game platform, including the exchange of the game data and the environment data. To be more specific, the USB interface controller accesses the game data stored in the storage device 60 through the storage device interface 13 and controls the data transmission and receipt of the first data transfer device 70 through the active interface 14 of the wireless data transfer device.

The software processing unit 30 is an application program unit to control the game software or an open source software. As described above, the software processing unit 30 stores the game software 31 and the software controller program 32. To be more specific, in the present invention to the computer device 50, the game software 31 and the software controller program 32 are one executable file, not a plurality of executable files. The software controller program 32 encapsulates the game software 31 as its parts. The game software 31 provides the game program to be executed in the computer 50. On the other hand, the software controller program 32 provides the encryption and decryption functions, the compression function and the hiding function for the game software 31, the user ID verification function and the internet linkage function. In addition, the software controller program 32 may be used in the execution of a plurality of game software. The purpose of encapsulating the game software 31 into the software controller program 32 is to achieve the above functions without the need of altering or damaging the contents of the game software.

The USB interface controller 22 on the game control module 20 side has the similar functions as those of the USB interface controller 12 on the game platform 10. The USB interface controller 22 communicates with the computer 50 and provides other input/output controls. The passive interface 23 of the wireless data transfer device links the wireless signal transfers between the game platform 10 and the game control module 20. The sensor interface 24 is a user-controlled sensor interface. The operations of the invented game system are mainly controlled by the game platform 10. After the USB interface controller 12 has established the USB standard communication channel with the computer 50, the game software 31 and the software controller program 32 as a whole are uploaded to the computer 50 by the USB interface controller 12.

Thereafter, the USB interface controller 12 first uploads the game software parts in the software controller program 32 to the computer 50, whereby the computer 50 starts to execute the game software. The USB interface controller 12 then uploads the controller parts of the software controller program 32 to the computer 50, to control the game software 31 being executed. At the same time, the screens of the game are displayed in the display device (not shown) of the computer 50.

The player uses his/her hands or other organs or parts to hold or to otherwise attach the game control module 20 and generates all kinds of bodily reactions in response to the progress of the game. The motion sensor 80 of the game control module 20 detects the position, orientation and movement, and their variations, of the game control module 20, whereby the bodily movements of the player may be detected. The strength, acceleration and vectors of such bodily movements are recorded to form the environment data. The environment data are then uploaded to the game platform 10 by the sensor interface 24 through the first and the second data transfer devices 70, 71, then to the computer 50 through the USB interface controller 12, or to the computer 50 directly through the USB interface controller 22. The computer thus uses the environment in the execution of the game software.

Embodiment II

Figure 2:
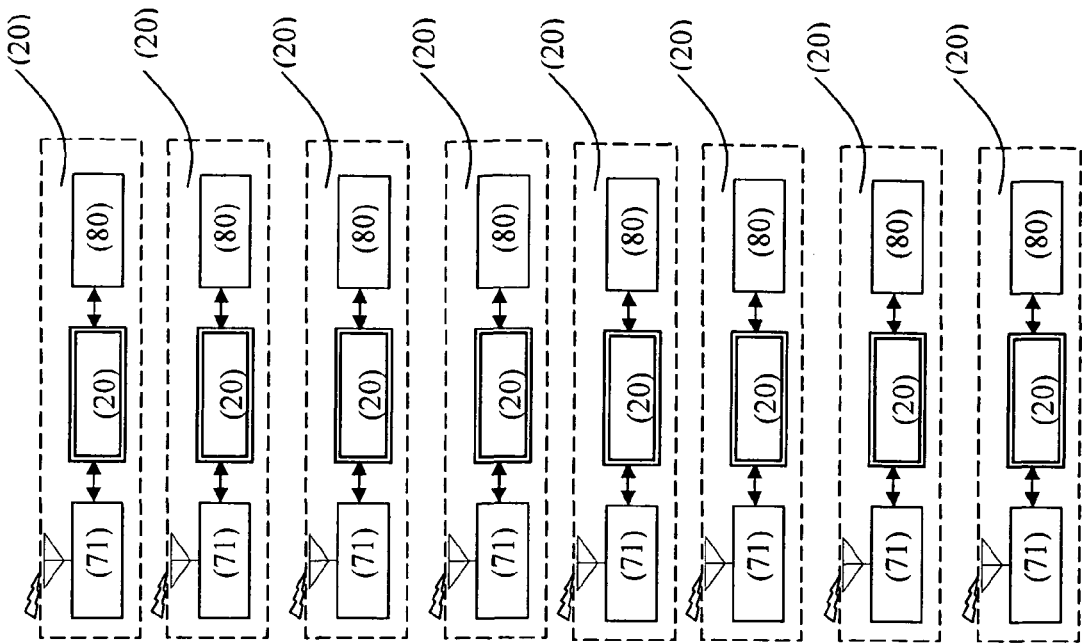
FIG. 2 illustrates the block diagram of the game system in the second embodiment of the present invention.
Figure 2:
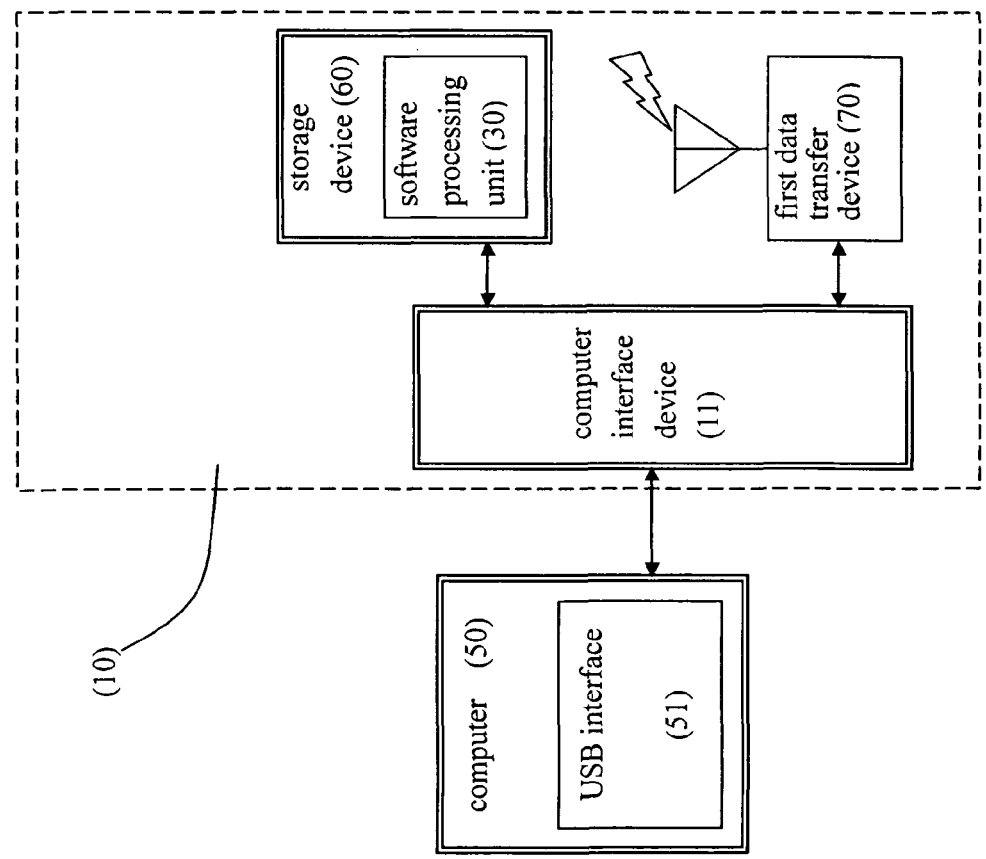

FIG. 2 is the block diagram of the second embodiment of the game system of the present invention. The game system of this embodiment is substantially the same as that of the first embodiment, except that there are 8 game control modules 20 in this embodiment. In other words, in this example a 1 to 8 wireless transfer structure is provided between the game platform 10 and the game control module 20.

In this embodiment, all the game control modules 20 have the same structure and functions. When one game control module 20 has established its communication channel with the first data transfer device 70 of the game platform 10 through its second data transfer device 71, the game platform 10 registers the game control module 20 into its game operation loop. In this embodiment the second game communication unit 14 of the game platform 10 accepts up to 8 game control modules 20 to register in the game operation loop. Correspondingly, the second game communication unit 14 of the game platform 10 divides its transmission band into 80 transmission frequency bands and distributes them evenly to the wireless data transfer devices of the 8 game control modules 20, to ensure no interferences among the game control modules would happen.

The 8 coexisting game control modules 20 are put in a queue in the time order of their registration with the second game communication unit 14. The series of the already registered game control modules 20 are given the frequencies and bands as designed. Thereby, the already registered game control modules 20 respectively communicate with the game platform 10 and control other inputs/outputs without any collision among one another.

In this embodiment, the game control module 20 provides two communication modes. The first is the wireless mode, in which the game control module 20 communicates with the game platform 10 and/or the computer 50 wirelessly. The second is the wired mode, in which the game control module 20 communicates with the game platform 10 and/or the computer 50 through the USB interface. The second control unit 22 of the game control module 20 may have the same functions as that of the first control unit 12 of the game platform 10, in that they may communicate with the computer 50 and conducts other data inputs/outputs.

To be more specific, in Embodiment I the game control module 20 has the sufficient power supply. Therefore, the game control module 20 is set to Mode 1, wherein the communication of the game control module 20 and the game platform 10 and/or the computer 50 goes through the wireless channels. When the game control module 20 needs recharge of electricity, it is set to Mode 2, wherein all communications go through the USB interface. In Mode 2, the USB interface 51 of the computer 50 supplies electric power to recharge the game control module 20. Therefore, then the game control module 20 is under Mode 2, the wireless data transfer device 70 will be switched OFF, whereby the input/output operations relating to the game execution will be controlled by the second control unit 22 of the game control module 20.

As the present invention has been shown and described with reference to preferred embodiments thereof, those skilled in the art will recognize that the above and other changes may be made therein without departing form the spirit and scope of the invention.

What is claimed is:

1. A game system, comprising:
   a computer device;
   a game platform to communicate with said computer device, said game platform comprising:
      a computer interface device to communicate with said computer device;
      a storage device to store at least one game software to be executed in said computer device;
      a first data transfer device; and
   at least one game control module to detect environment data and to transfer said environment data to said game platform;
      wherein said game platform stores said at least one game software, whereby said computer device executes said at least one game software in association with said environment data,
      wherein said computer interface device accesses game software data from said storage device and transfers said game software data to said computer device,
      wherein said first data transfer device accepts said environment data and transfers said environment data to said computer device through said computer interface device,
      wherein said computer interface device comprises a first control unit, a first game communication unit and a second game communication unit, said first control unit accessing said game software data, which has been stored in said storage device, through said first game communication unit, and said first control unit controlling, through said second game communication unit, data transmission and data receipt of said first data transfer device, and
      wherein said first control unit conducts game software data communications and environment data communications with said computer device.

2. The game system of claim 1, wherein said storage device comprises a software controller program to encrypt, decrypt and to hide said at least one game software, to verify identification of a player and to connect to the Internet.

3. The game system of claim 1, wherein said at least one game control module comprises two to eight game control modules.

4. The game system of claim 1, wherein said computer device further comprises a USB interface and said first control unit communicates with said computer through said USB interface.

5. The game system of claim 1, wherein said first game communication unit is a storage device interface.

6. The game system of claim 1, wherein said second game communication unit is the an active interface of a wireless data transfer device.

7. The game system of claim 1, wherein said storage device is one selected from the group consisting of a NAND-type flash memory and a NOR-type flash memory.

8. The game system of claim 1, wherein each said at least one game control module comprises a game control interface device, a motion sensor and a second data transfer device; wherein said motion sensor detects said environment data and said game control interface device transfers said environment data to said game platform through said second data transfer device.

9. The game system of claim 8, wherein said game control interface device comprises a first control communication unit and a second control communication unit;
wherein said motion sensor detects orientations and movement vectors of said game control module and their variations to form said environment data and to transfer said environment data to said game platform through said first control communication unit and said second control communication unit via said second data transfer device.

10. The game system of claim 9, wherein said motion sensor is one selected from the group consisting of a gravity sensor, an acceleration sensor, a gyroscope, a motion sensor, an image sensor and combinations of the gravity sensor, acceleration sensor, gyroscope, motion sensor, and image sensor.

11. The game system of claim 9, wherein said control communication unit is a sensor interface.

12. The game system of claim 9, wherein said second control communication unit is a passive interface of a wireless data transfer device.

13. The game system of claim 8, wherein said game control interface device comprises a first control communication unit and a second control unit;
wherein said motion sensor detects orientations and movement vectors of said game control module and their variations to form said environment data and to transfer said environment data to said computer device through said second control unit via said first control communication unit.

14. The game system of claim 13, wherein said motion sensor is one selected from the group consisting of a gravity sensor, an acceleration sensor, a gyroscope, a motion sensor, an image sensor and combinations of the gravity sensor, acceleration sensor, gyroscope, motion sensor, and image sensor.

15. The game system of claim 13, wherein said first control communication unit is a sensor interface.

16. The game system of claim 13, wherein said second control unit is a USB interface controller.

17. The game system of claim 8, wherein said game control interface includes a first control communication unit, a second control communication unit and a second control unit; and wherein said game system provides two operation modes:
wherein in a first operation mode said motion sensor detects orientations and movement vectors of said game control module and their variations to form said environment data and to transfer said environment data to said game platform through said first control communication unit and said second game communication unit via said second data transfer device, and
wherein in a second operation mode said motion sensor detects orientations and movement vectors of said game control module and their variations to form said environment data and to transfer said environment data to said computer device through said second control unit via said first control communication unit.

18. The game system of claim 17, wherein said motion sensor is one selected from the group consisting of a gravity sensor, an acceleration sensor, a gyroscope, a motion sensor, an image sensor and their combinations of the gravity sensor, acceleration sensor, gyroscope, motion sensor, and image sensor.

19. The game system of claim 17, wherein said control communication unit is a sensor interface.

20. The game system of claim 17, wherein said second control communication unit is a passive interface of a wireless data transfer device.

21. The game system of claim 17, wherein said second control unit is a USB interface controller.

\* \* \* \* \*